No. 847,486. PATENTED MAR. 19, 1907.
W. MABLE.
WINDOW CLEANER.
APPLICATION FILED APR. 2, 1906.
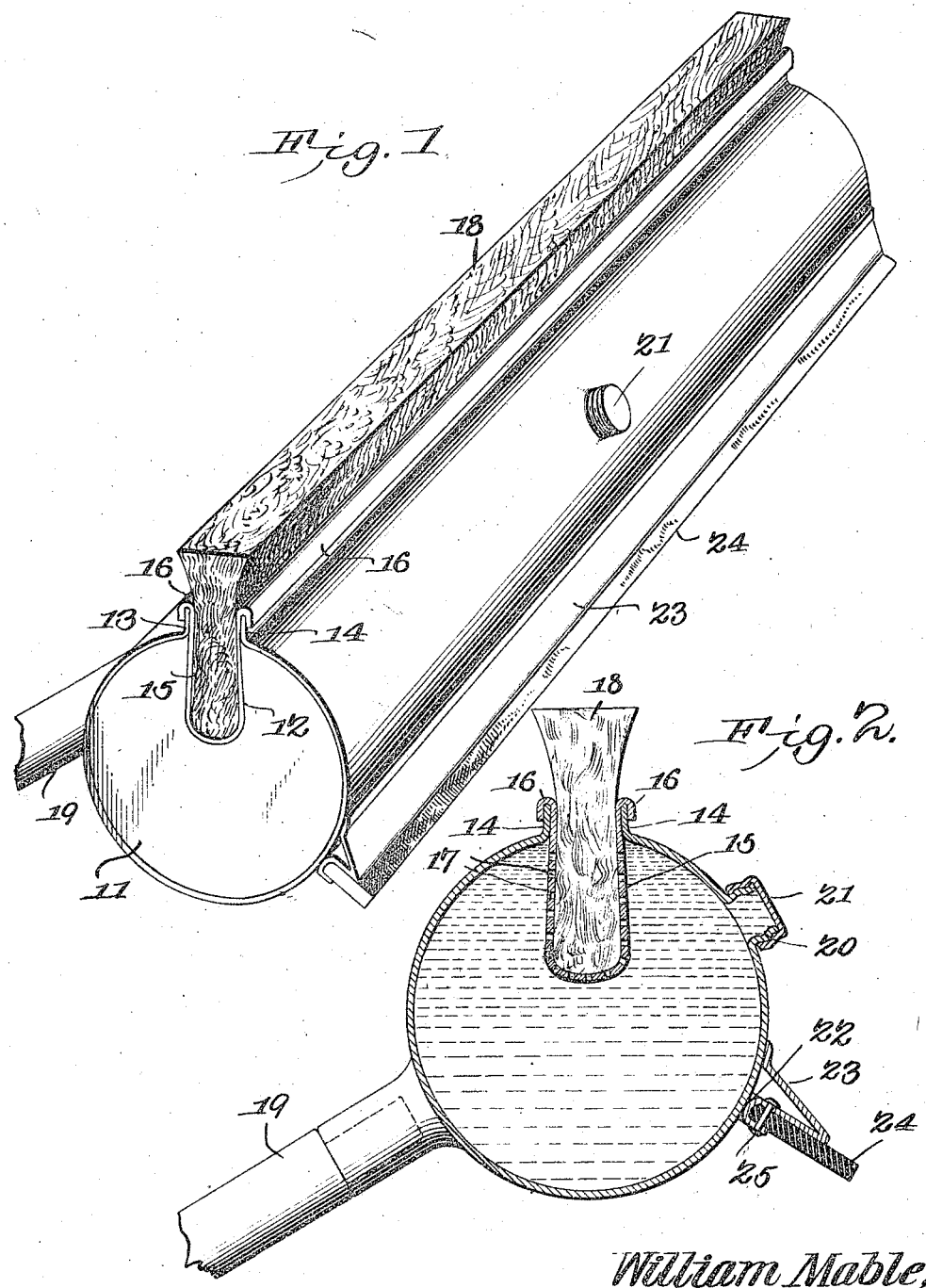
WITNESSES:
E. F. Stewart
C. N. Woodward
William Mable,
INVENTOR.
By Cashow & Co
ATTORNEYS

UNITED STATES PATENT OFFICE.

WILLIAM MABLE, OF FORT COLLINS, COLORADO.

WINDOW-CLEANER.

No. 847,486.   Specification of Letters Patent.   Patented March 19, 1907.

Application filed April 2, 1906. Serial No. 309,418.

*To all whom it may concern:*

Be it known that I, WILLIAM MABLE, a citizen of the United States, residing at Fort Collins, in the county of Larimer and State of Colorado, have invented a new and useful Window-Cleaner, of which the following is a specification.

This invention relates to improvements in implements for cleaning windows and for similar purposes, and has for its object to provide a simply-constructed and conveniently-arranged device comprising a reservoir for water, an absorbent element associated with the reservoir, and a wiping-strip or drier likewise associated with the reservoir.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a perspective view of the improved implement. Fig. 2 is a transverse section of the same.

The reservoir portion of the implement (represented at 10) is preferably cylindrical and closed at the ends, one of the ends being indicated at 11. Each end is provided with a radial recess, one of the recesses being indicated at 12 in the end 11, and it will be understood that the opposite end of the reservoir is provided with a like recess.

The reservoir 10 is provided with a longitudinal aperture in one side and with the walls of the reservoir at the edges of the aperture turned outwardly, as at 13 14, the outturned edges being in alinement with the radial end recesses 12.

Fitting into the aperture in the reservoir and the recesses in the ends of the same is a trough-shaped member 15, the outer edges of the member 15 bent over the free edges of the projections 14, as represented at 16.

The trough-shaped member is provided with a plurality of transverse apertures 17, communicating with the interior of the reservoir, the member 15 being preferably slightly widest at the lower end and designed to support an absorbent element 18—such as sponge, felt, or the like—the absorbent element extending beyond the turned-over edges 16, as shown. The water within the reservoir thus passes freely through the aperture 17 to the absorbent element, as will be obvious.

The reservoir 10 is provided with a handle 19 of suitable construction and with an aperture 20, provided with a suitable closure 21, through which the water is supplied to the reservoir.

Attached to the reservoir 10 is holding-strip 22 of sheet metal, preferably U-shaped in transverse section, with one side longer than the other and the longest side supported by brace 23.

The holding-strip is designed to support a wiper element, of rubber or similar material, secured in position by rivets or other suitable means. The holding-strip 22 is preferably located at the opposite side of the reservoir from the absorbent element, as shown, but may be otherwise located, if preferred.

With the device thus constructed it will be obvious that the water may be supplied in sufficient quantity to the absorbent element when the implement is drawn back and forth across the glass to be cleansed and thus remove the adhering matter therefrom, and when this is accomplished the implement is reversed in position and the wiper element 24 employed in the usual manner to complete the operation.

The device is simple in construction, can be inexpensively manufactured, and the absorbent element readily removed when worn or fractured and replaced by a new element.

The natural expansion of the absorbent element coacting with the laterally-enlarged inner portion of the trough-shaped member prevents accidental displacement of the absorbent element while in use.

The implement may be of any required size or capacity and of any suitable material.

Having thus described the invention, what is claimed as new is—

1. In a device of the class described, a receptacle having a peripheral aperture with the sides extending radially of the receptacle, and a trough-shaped member having spaced orifices and supported in said aperture with the edges bearing over the extended edges of the aperture.

2. In a device of the class described, a receptacle having a peripheral aperture and radial recesses in the ends in alinement with the aperture, and a trough-shaped member having spaced orifices and disposed in said receptacle and recesses with the edges bearing over the edges of the receptacle-aperture.

3. In a device of the class described, a receptacle having a peripheral aperture with the sides extending radially of the receptacle and the trough-shaped member having spaced orifices and extending through said aperture and between said extended sides and with its edges bearing over said extended sides.

4. In a device of the class described, a receptacle having a peripheral aperture with the sides extending radially of the receptacle and with recesses in the ends in alinement with said receptacle-aperture, and a trough-shaped member having spaced orifices and supported in said aperture and recesses and with the edges bearing over the extended edges of the aperture.

In testimony that I claim the foregoing as my own I have hereto affixed my signature in the presence of two witnesses.

WILLIAM MABLE.

Witnesses:
JAMES SWEENEY,
ERNEST J. GLESSNER.